United States Patent [19]

Jaquay

[11] 4,133,718

[45] Jan. 9, 1979

[54] METHOD FOR AGGLOMERATING FINELY DIVIDED AGGLOMERATIVE MATERIALS IN A ROTARY DRUM ASSEMBLY

[75] Inventor: Louis H. Jaquay, Pittsburgh, Pa.

[73] Assignee: Dravo Corporation, Pittsburgh, Pa.

[21] Appl. No.: 809,370

[22] Filed: Jun. 23, 1977

Related U.S. Application Data

[63] Continuation of Ser. No. 687,104, May 17, 1976, abandoned.

[51] Int. Cl.² ............................ C10B 45/02; B01J 2/12
[52] U.S. Cl. ............................................ 201/6; 201/5; 202/131; 202/100; 202/136; 202/216; 44/10 R; 264/117; 23/313 R; 23/314; 432/106; 432/74; 34/242
[58] Field of Search ............... 201/6, 5; 202/131, 100, 202/136, 216; 44/10 R, 12; 264/117; 23/313, 314, 286; 432/106, 74; 34/127, 129, 242

[56] References Cited

U.S. PATENT DOCUMENTS

| | | | |
|---|---|---|---|
| 1,914,462 | 6/1933 | Ronne | 432/74 |
| 2,680,084 | 6/1954 | Ryan | 23/286 X |
| 2,728,940 | 1/1956 | Yesberger et al. | 23/313 X |

*Primary Examiner*—James H. Tayman, Jr.

*Attorney, Agent, or Firm*—Stanley J. Price, Jr.; John M. Adams

[57] ABSTRACT

Rotation of a first drum member at a preselected speed intimately mixes finely divided agglomerative materials to form a loosely coherent, plastic sticky mass. The tumbling action generated by the rotating drum breaks up the loosely coherent, plastic mass into plastic particles or agglomerates which grow in size as they roll within the first drum member. The formed agglomerates are conveyed by rotation of the first drum member into a second drum member that includes an inlet portion surrounding the outlet portion of the first drum member. The second drum member has a longitudinal axis that is coplanarly aligned with the longitudinal axis of the first drum member and both drum members are independently rotated at preselected peripheral speeds with the angle of inclination of the first drum member being adjustable relative to the second drum member to control the movement of the agglomerates. In the second drum member the agglomerates rigidify as substantially uniformly sized particles within a preselected size range. The intersection of the drum members together with the inlet of the first drum member and the outlet of the second drum member include seal assemblies for maintaining an inert atmosphere under positive pressure within the respective drum members.

7 Claims, 8 Drawing Figures

METHOD FOR AGGLOMERATING FINELY DIVIDED AGGLOMERATIVE MATERIALS IN A ROTARY DRUM ASSEMBLY

CROSS REFERENCES TO RELATED APPLICATIONS

This application is a continuation of application Ser. No. 687,104, filed May 17, 1976, entitled "Method For Agglomerating Finely Divided Agglomerative Materials In A Rotary Drum Assembly", now abandoned.

BACKGROUND OF THE INVENTION

1. Field of the Invention

This invention relates to a method for forming an agglomerated product from agglomerative materials in a rotating drum assembly and more particularly to agglomerating an admixture of finely divided coal particles in a first rotating drum to form carbonaceous agglomerates and feeding the agglomerates into a second rotary drum connected to the first rotary drum to rigidify the substantially uniformly sized agglomerates.

2. Description of the Prior Art

In the process for making coke, as described in U.S. Pat. Nos. 3,073,351; 3,401,089 and 3,562,783, particulate bituminous coal and finely divided char (the solid carbonaceous residue of coal which has been distilled at a temperature of between 800° and 1400° F) are introduced into a rotary drum. Depending on the type of coal employed and the ratio of coal to char, pitch may also be added as a binder and to increase the strength of the agglomerates formed in the process. The preheated coal and char supply as sensible heat substantially all the heat required to achieve the desired temperature for agglomerating the carbonaceous materials.

The materials are intimately mixed by rotation of the drum. As the constituents are mixed, the coal particles are further heated to such an extent that partial distillation of the coal particles occurs, evolving tar and forming a loosely coherent, plastic sticky mass in the rotary drum. Rotation of the drum breaks up the loosely coherent, plastic sticky mass into relatively fine plastic particles which grow in size as a result of the rolling action of the plastic mass of particulate material in the drum. During the mixing or ball forming stage, the rate of movement of the agglomerative materials through the drum, the rotational speed of the drum and inclination of the drum relative to the horizontal frame determine the size of the agglomerated product.

Growth of the plastic particles is attained by a snowballing type of tumbling or rolling action on the upper inclined exposed surface of the plastic mass of particulate material in the drum. Repeated tumbling or rolling of the particles causes the continued growth of the plastic particles into agglomerates. The agglomerates will continue to grow as determined by the above factors until the binder evolved by the coal particles and the pitch binder, if employed, loses its plasticity. Thereafter, the agglomerates in the drum rigidify or harden to form uniformly sizes particles that are discharged from the outlet portion of the drum. It is of primary importance that the agglomerated product formed be uniformly sized, preferably in the range of between 1⅞ ×2 inches. Agglomerates having a size greater than about 2 inches and a size less than about ¾ inches are considered unsuitable for use in a conventional blast furnace or other conventional metallurgical processes.

Processes for agglomerating finely divided solid material in a rotary drum are illustrated and described in U.S. Pat. Nos. 2,778,056; 2,695,221 and 1,921,114; British Pat. No. 779,302 and Canadian Pat. No. 627,037 and utilize a single drum to perform the steps of mixing, forming and hardening of the agglomerative materials to form the agglomerated product. The finely divided solid material is introduced into the inlet portion of the rotary drum by screw conveyors, and the agglomerated product of a preselected size is discharged from the outlet portion of the rotary drum.

The forming stage and the hardening stage in the production of the agglomerated product require varying operating conditions. For example, during the forming stage the rotational speed of the drum should be greater than the rotational speed of the drum during the hardening stage in order to control the size of the agglomerated product. Factors that control the size of the agglomerated product include the rate of movement of the agglomerated product through the drum and the number of times the agglomerate is tumbled in the drum down the inclined surface of the agglomerative material. These factors, in turn, are controlled by the rate of rotation and inclination of the drum with respect to the horizontal. For optimum results the drum should rotate at a higher speed during the forming stage than during the hardening stage. Also, the slope of the drum during the forming stage should be shallower than the drum during the hardening stage. To provide these varying operating conditions with a single drum arrangement is not possible.

There is need for a method of controlling the formation of agglomerated products from finely divided agglomerative materials in which the process steps of forming the agglomerated product and hardening the agglomerated product may be independently controlled.

SUMMARY OF THE INVENTION

In accordance with the present invention, there is provided a method for forming an agglomerated product from agglomerative materials that includes the step of feeding finely divided agglomerative materials into a first drum member. The first drum member has an inner cylindrical wall and a longitudinal axis with the first drum member being arranged to rotate about the longitidinal axis thereof. The first drum member is rotated at a preselected speed to intimately mix the finely divided agglomerative materials in the first drum member. The agglomerates are conveyed from the first drum member into a second drum member. The second drum member has a longitudinal axis of rotation coplanarly aligned with that of the first drum member and with an inlet portion of the second drum member surrounding the outlet portion of the first drum member. In the second drum member the agglomerates are rigidified to form rigidified agglomerates. The rigidified agglomerates are conveyed by rotation of the second drum member from the discharge portion thereof.

In the first drum member a layer of the coherent plastic mass is deposited on the surface of the inner wall thereof. A scraper is rotatably supported within the first drum member and is rotated in timed relation thereto. The scraper controls the thickness of the deposited layer and forms a plurality of elongated ridges and valleys in the deposited layer that improves the mixing of the agglomerative materials and the tumbling of the agglomerates on the inclined surface of the agglomerative materials.

The rear portion of the scraper is supported within the first drum member by a support member that is positioned within the second drum member. The rate of movement of the finely divided agglomerative materials and formed agglomerates through the first drum member is controlled by adjusting the slope of the first drum member relative to the second drum member. Furthermore, by rotating the first drum member at a first peripheral speed and the second drum member at a second peripheral speed, the size consist of the formed agglomerates is controlled in the first drum member and the residence time to rigidify the agglomerates is controlled in the second drum member.

The first drum member is pivotally supported relative to the second drum member at the intersection of the longitudinal axes of the respective drum members. With this arrangement, the angle of inclination of the first drum member may be changed relative to the second drum member to thereby control the rate of movement of the formed agglomerates from the first drum member into the second drum member. In addition, the first and second drum members are independently rotatable relative one another at a preselected speed by individual variable speed motors that are drivingly connected to the respective drum members. Preferably, the first drum member is rotated at a preselected peripheral speed greater than the second drum member with the slope of the first drum member maintained less than the slope of the second drum member.

A plurality of seal assemblies surround the respective drum members to seal the inner portions thereof to maintain an inert atmosphere under positive pressure therein. The seal assemblies maintain a fluid-tight seal at the intersection of the respective drum members during expansion and contraction of the drum members as the agglomeration and rigidification is carried out.

Accordingly, the principal object of the present invention is to provide a method for forming an agglomerated product from agglomerative materials that includes feeding finely divided agglomerative materials into a first drum member in which the materials are formed into plastic agglomerates of a preselected size and are conveyed into a second drum member having an inlet positioned in surrounding relation with the outlet of the first drum member for rigidifying the agglomerates as rigid substantially uniform agglomerates.

Another object of the present invention is to provide a method for forming an agglomerated product from agglomerative materials in which the agglomerated product is formed in a first drum member that is aligned and pivotally connected relative to a second drum member into which the formed agglomerates are transferred with an absolute minimum of damage and are rigidified with the rigidified agglomerates being discharged from the outlet portion of the second drum member.

An additional object of the present invention is to provide a method for forming an agglomerated product from agglomerative materials in which the rate of movement of the finely divided agglomerative materials through the first drum member is controlled by selectively rotating the first drum member at a preselected peripheral speed and adjusting the slope thereof relative to the second drum member.

A further object of the present invention is to provide a method for forming an agglomerated product from agglomerative materials in which a pair of drum members are longitudinally aligned and pivotally connected for independent rotation at different preselected peripheral speeds to thereby control the rate of movement of the agglomerated product through the drum members and the size consist of the agglomerates formed by the agglomeration process.

These and other objects and advantages of the present invention will be more completely disclosed and described in the following specification, the accompanying drawings and the appended claims.

DESCRIPTION OF THE PREFERRED EMBODIMENT

Figure 1:
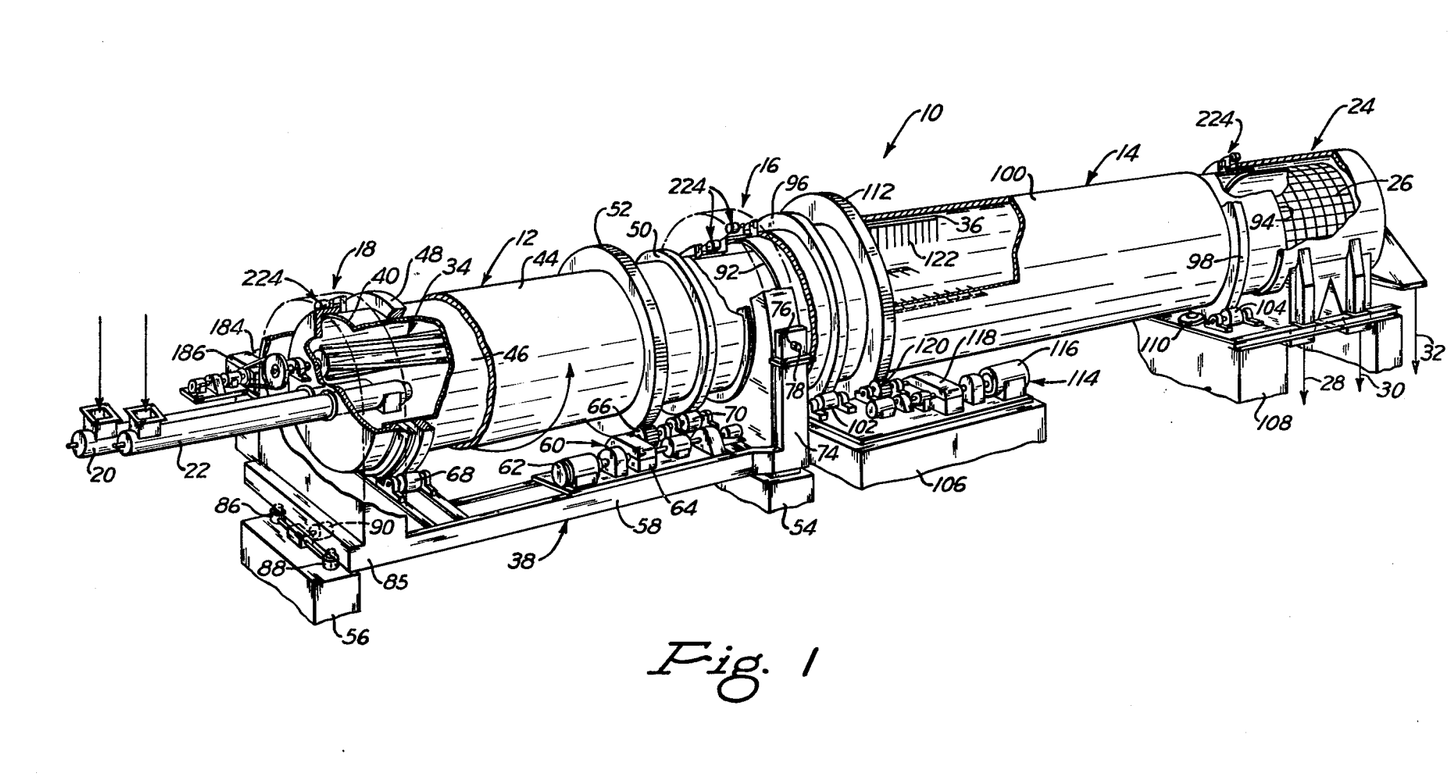
FIG. 1 is a perspective view of the rotary drum assembly that includes separate balling and hardening drums with portions broken away to illustrate the mechanical seal between the respective drums, the rotary scraper in the balling drum, the rakes in the hardening drum and the integral trommel screen.

Referring to the drawings and particularly FIG. 1 the rotary drum assembly generally designated by the numeral 10 includes a balling drum 12 and a hardening drum 14. The balling drum 12 is longitudinally aligned with the hardening drum 14 and the balling drum 12 has its discharge portion extending into the inlet portion of the hardening drum. A center breech assembly 16 extends around the discharge end portion of the balling drum 12 and the inlet end of hardening drum 14 and, as later discussed, provides a suitable seal for the respective drums to maintain a positive pressure within the drum assembly 10. A feed end breech assembly 18 surrounds the feed end of the balling drum 12 and also has suitable seals, as later discussed, to maintain the positive pressure within the drum assembly 10.

A pair of feed screw conveyors 20 and 22 extend through suitable seals in the feed end breech 18 and are arranged to supply agglomerative material, such as coal and char, to the inner portion of the balling drum 12. The discharge end of the hardening drum 14 extends into a discharge end breech assembly 24 which also has suitable seal means to provide positive pressure within the drum assembly 10. A trommel screen 26 is secured to the discharge end of the hardening drum 14 and is positioned within the discharge breech assembly 24. The discharge breech assembly 24 has a plurality of outlets 28, 30 and 32 for the material agglomerated in the drum assembly 10. The agglomerated product having the desired size consist is arranged to be discharged from the drum assembly 10 through outlets 28 and 30 and the oversized product is discharged through outlet 32.

A rotary scraper assembly generally designated by the numeral 34 is supported within the balling drum 12 and is arranged to control the thickness of the agglomerative material deposited on the inner wall of the balling drum 12 and as described in co-pending application, Ser. No. 627,689, entitled "Method And Apparatus For Agglomerating Finely Divided Agglomerative Materials In A Rotating Drum", provide ridges and valleys within the balling drum 12 to aid in the mixing and agglomeration of the agglomerative material within balling drum 12.

Positioned within hardening drum 14 are a plurality of rakes 36 that extend radially therein and are arranged to assist in controlling the size consist of the agglomerated material that is rigidified within the hardening drum 14. Suitable drive means, later described, rotate the balling drum 12 and hardening drum 14 at different peripheral speeds and rotate the rotary scraper assembly 34 at a preselected speed and preferably in timed relation with the balling drum 12.

The balling drum 12 is supported on a platform assembly generally designated by the numeral 38 that is pivotally secured at one end to the center breech assembly 16. The platform assembly 38 is arranged to change the angle of inclination of the balling drum 12 to thereby control the rate of flow of the agglomerative material through the balling drum 12. The balling and hardening drums 12 and 14 are so arranged that their longitudinal axes intersect at a location coincident with the pivot axis of the platform assembly 38 so that the platform pivots the balling drum 12 at the intersection of the balling drum and hardening drum axes.

With the above arrangement agglomerative material as, for example, particulate coal and finely divided char, previously heated to an elevated temperature is introduced through conveyors 20 and 22 into the balling drum assembly 12. The preheated coal and char are arranged to supply as sensible heat substantially all of the heat required to achieve the desired temperature for agglomerating the carbonaceous materials. An inert atmosphere is maintained within the drum assembly 10 and a positive pressure of between one and three inches water is maintained within the drum assembly 10 by means of the seals provided at the breech assemblies 16, 18 and 24.

The balling drum 12 is rotated at a preselected speed to effect intimate mixing of the constituents and tumbling of the agglomerates as they are formed in the balling drum 12. As the constituents are admixed in the balling drum the coal particles are further heated to an extent that partial distillation of the coal particles occurs evolving tar and forming a loosely coherent, plastic sticky mass in the balling drum 12. Where desired, a pitch binder may also be supplied to the balling drum 12 to further contribute to the agglomeration of the carbonaceous material within the balling drum. The loosely coherent, plastic mass formed in the balling drum 12 breaks up during tumbling into relatively fine plastic particles. Growth of the plastic particles within the balling drum 12 is attained by a snowballing type of tumbling or rolling action on the upper exposed surface of the plastic mass of particulate material in the balling drum 12.

A portion of the plastic mass is deposited on the inner wall of the balling drum 12 and the rotary scraper controls the thickness of the plastic mass so deposited and further forms ridges and valleys in the deposited material to improve the mixing and tumbling of the particles as they agglomerate.

The agglomerates so formed within the balling drum 12 continue to grow until the binder evolved by the coal particles and pitch, if employed, loses its plasticity. The agglomerates so formed are conveyed by the rotation of the balling drum 12 into the hardening drum 14. In the hardening drum 14 the remaining binder is evolved from the agglomerates and the agglomerates rigidify in the hardening drum 14 as substantially uniformly sized agglomerates.

The rotation of the hardening drum 14 conveys the rigidified agglomerates to the trommel screen 26 where agglomerates of a preselected size are discharged through the openings in the trommel screen and through outlets 28 and 30. The oversized agglomerates that do not pass through the openings in the trommel screen 26 are discharged through the opening 32. The oversized agglomerates may be crushed and recycled as a constituent of the feed introduced into the balling drum 12. The product of the preselected size recovered through outlets 28 and 30 is thereafter calcined in a calcining vessel at an elevated temperature of between 1500° F. and 1800° F. to form a formcoke that has strength and abrasion resistance that is equal or superior to that of conventional blast furnace coke.

Figure 2:
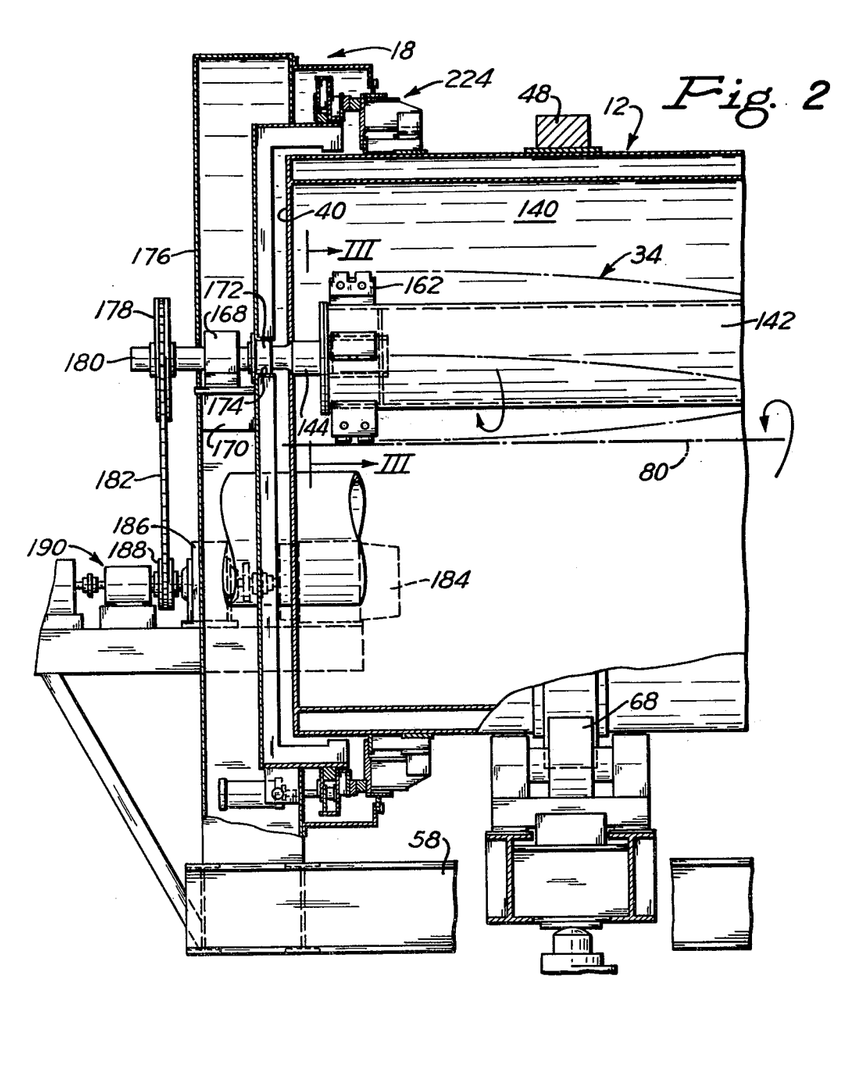
FIG. 2 is a view in side elevation of the balling drum feed end, illustrating the seal means for the feed end of the balling drum and the manner in which one end of the rotary scraper is rotatably mounted and driven.
Figure 5:
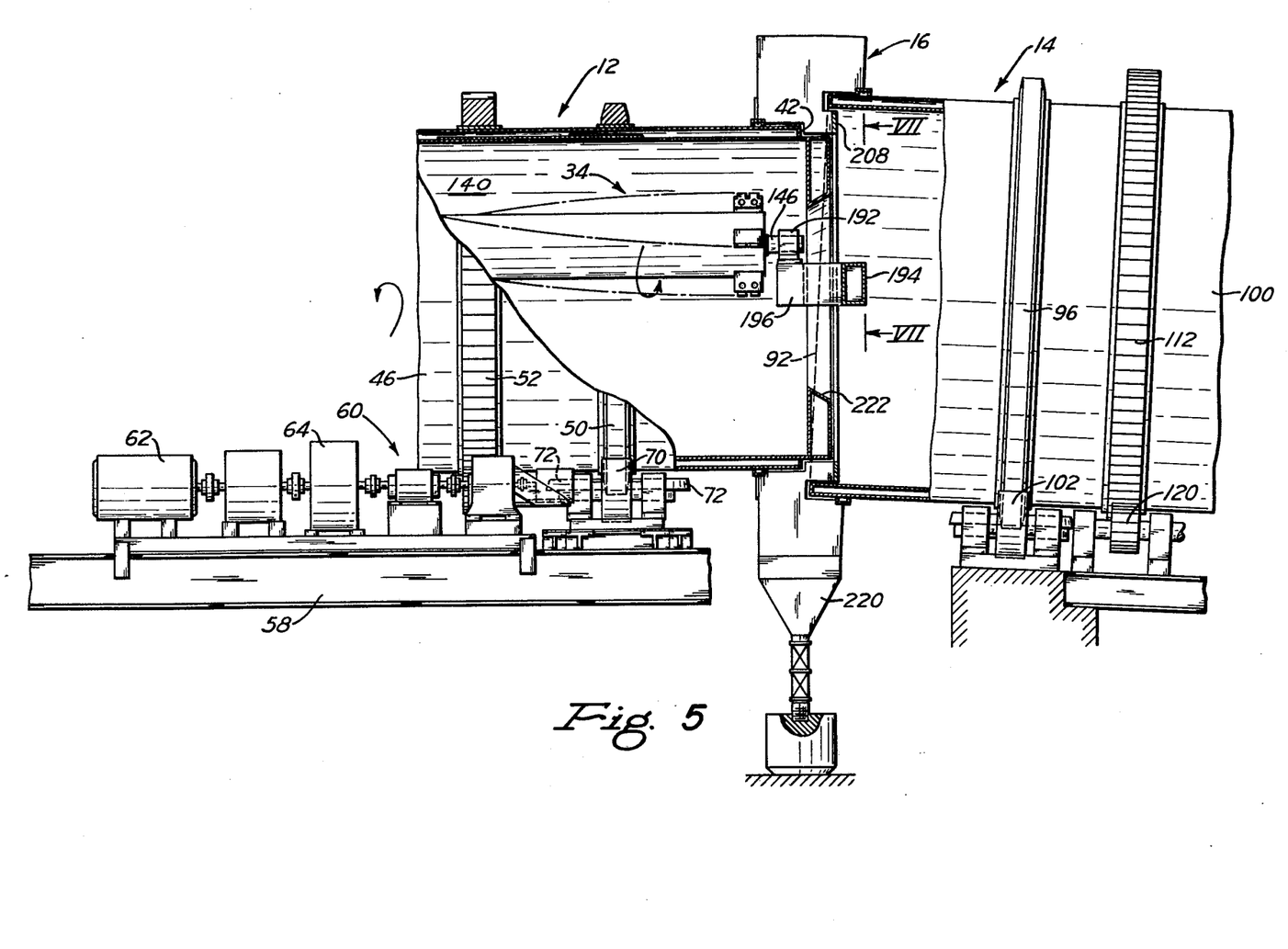
FIG. 5 is a fragmentary view in side elevation of the balling drum discharge end and the hardening drum inlet portion, illustrating the manner in which the opposite end portion of the rotary scraper is supported within the balling drum.

The balling drum 12 has a generally cylindrical configuration with an inlet end portion 40 and an outlet end portion 42 (FIGS. 1, 2 and 5). A suitable insulation material 44 may be positioned on the outer surface of the drum body portion 46 to reduce heat loss through the wall of the balling drum 12 during the agglomeration process. The balling drum 12 has a pair of riding rings 48 and 50 adjacent the inlet end portion 40 and the discharge end portion 42. A drive ring gear 52 is secured to the outer surface of the balling drum 12 between the rings 48 and 50.

The center breech assembly 16 is supported on a fixed pad 54 and the front end of the platform 38 is supported on a second fixed pad 56. The platform assembly 38 includes a frame member 58 positioned beneath the balling drum 12. Mounted on the frame member 58 is a separate balling drum drive assembly generally designated by the numeral 60 that includes a drive motor 62, a reducer 64 and a pinion gear 66 that meshes with the drive ring gear 52. The riding rings 48 and 50 are supported on pairs of trunnion rollers 68 and 70 with suitable thrust wheels 72 abutting the sides of the respective rings 48 and 50, as illustrated in FIG. 5.

Figure 6:
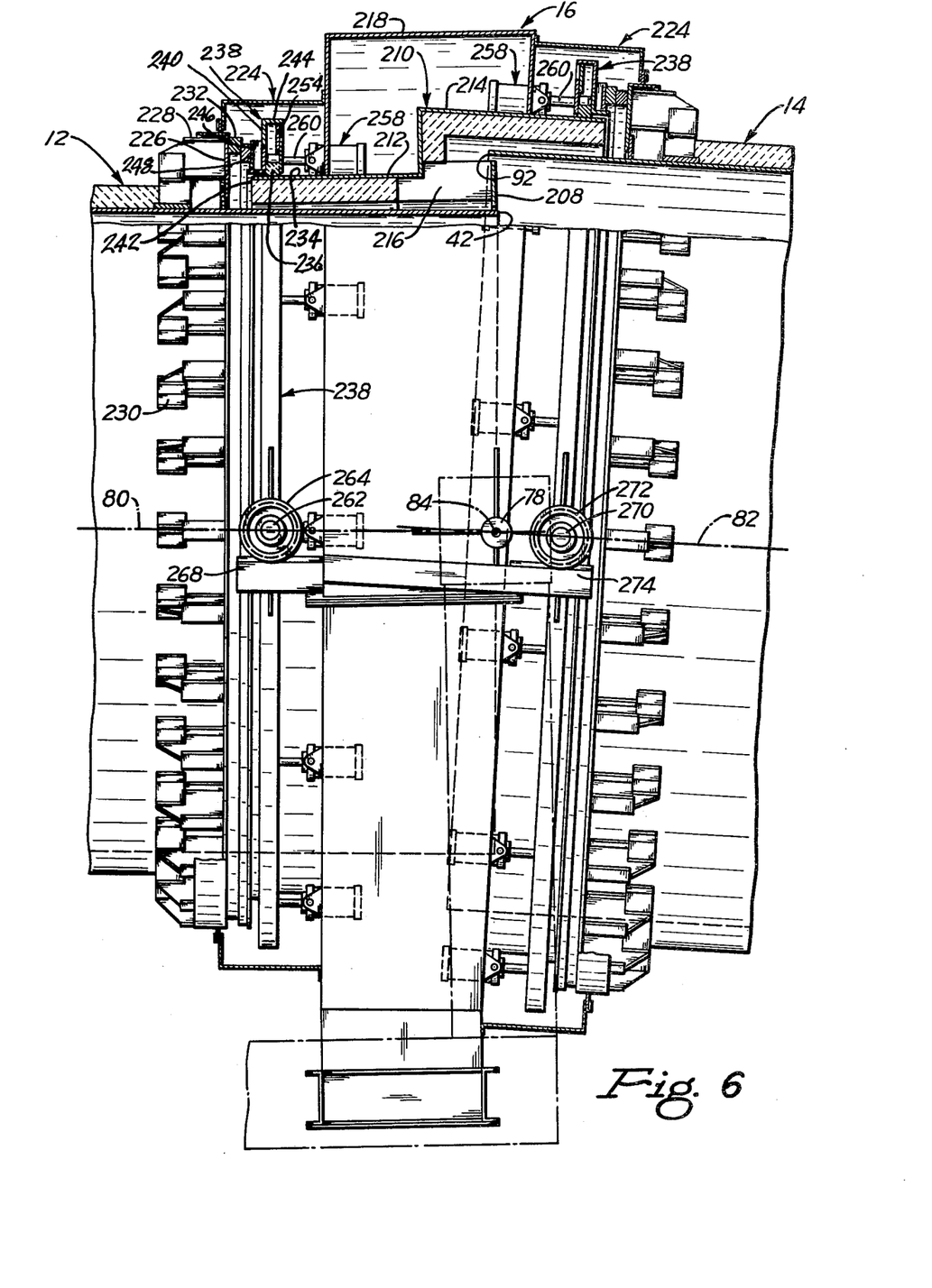
FIG. 6 is a fragmentary view in side elevation and partially in section, illustrating the mechanical seal means for the discharge portion of the balling drum and the inlet portion of the hardening drum.

The platform assembly frame member 58 has a pair of upstanding leg portions 74, one of which is illustrated in FIG. 1. The upstanding leg portions have bores 76 therethrough adjacent the upper end portion. The center breech assembly 16 has a pair of trunnion shafts 78 extending outwardly therefrom through the bores 76 in frame member leg portions 74 to thus support that portion of the frame member 58 adjacent the balling drum discharge end portion 42. As is illustrated in FIG. 6, the longitudinal axis 80 of balling drum 12 intersects the longitudinal axis 82 of the hardening drum 14 at the axis 84 formed by the trunnion shafts 78 so that the balling drum support platform 38 pivots about the intersection of the axes 80 and 82.

The frame 58 has a front end portion 85 which is mounted on a plurality of jack devices 86 and 88. The jack devices 86 and 88 are supported on pad 56 and are arranged to be driven by a motor 90 to raise and lower the frame front end portion 85 and thus pivot the frame about the trunnion shafts 78 and adjust the slope of balling drum 12 relative to the hardening drum 14. It should be noted with this arrangement that the balling drum 12 pivots about the intersection of the axes 80 and 82 as previously described.

The hardening drum 14 has a generally cylindrical configuration with an inlet end portion 92 and an outlet end portion 94. Although not illustrated in FIG. 1, the hardening drum body portion 100 has a suitable layer of insulation material secured thereto to reduce heat transfer therethrough during the agglomeration process. A pair of annular rings 96 and 98 are secured to the hardening drum body portion 100 adjacent the inlet and outlet end portions. Pairs of trunnion rollers 102 and 104 are supported on fixed pads 106 and 108 and rotatably support the hardening drum 14. Thrush wheels 110 maintain the rings 96 and 98 in operative position on the trunnion rollers 102 and 104. The platforms 106 and 108 are so constructed to provide the desired angle of inclination for the hardening drum 14.

The hardening drum body portion 100 has a ring gear 112 secured thereto adjacent the ring 96. A hardening drum drive assembly generally designated by the numeral 114 is supported on the platform or pad 106 and includes a motor 116, a reducer 118 and a pinion gear 120 meshing with the ring gear 112. With this arrangement, the hardening drum 14 may be rotated at a preselected speed that is independent of the speed of rotation of the balling drum 12. Secured to the inner wall of hardening drum body portion 100 are a plurality of rakes 36 that have inwardly extending tines 122. The rakes 36 extend longitudinally throughout a portion of the hardening drum 14 and are arranged as described in U.S. Pat. No. 3,628,012 and U.S. Pat. No. 3,460,195 to control the size consist of the agglomerates during the hardening process and before the agglomerates have rigidified.

Figure 7:
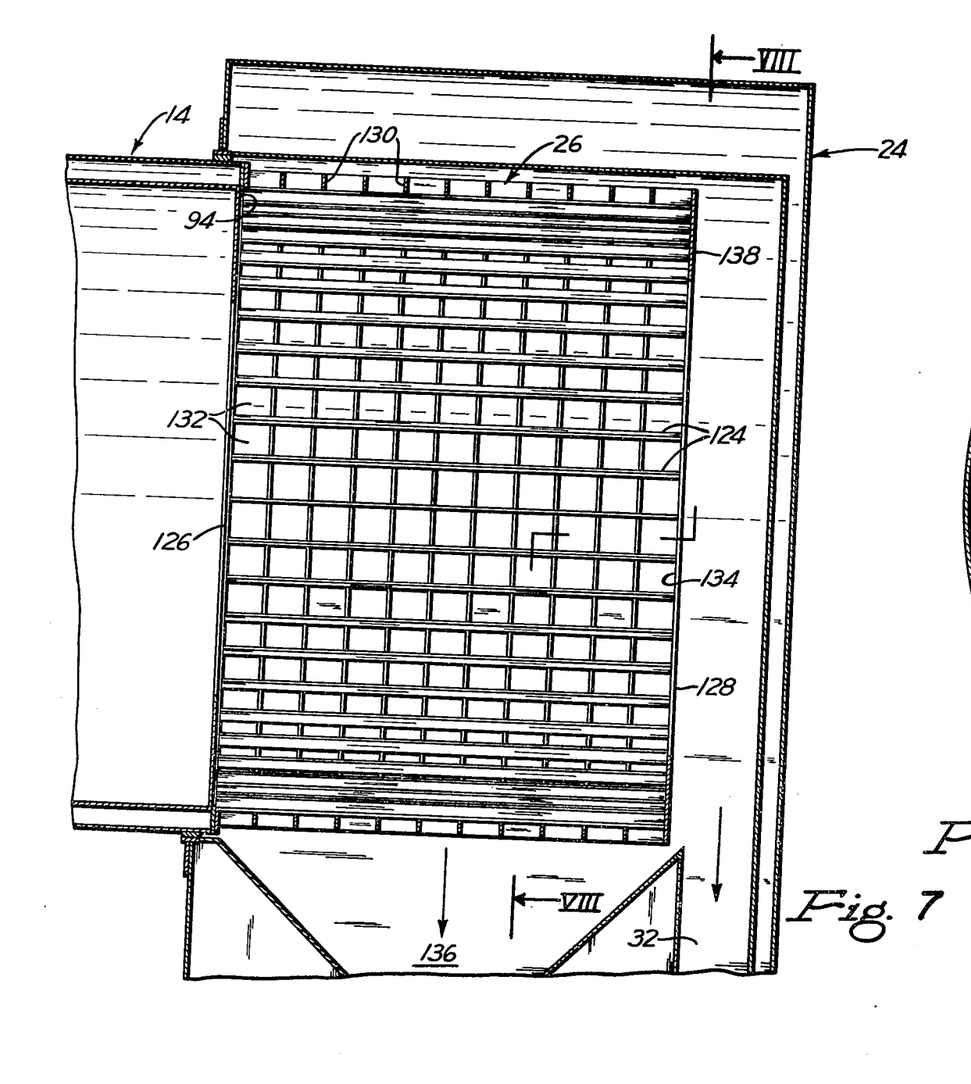
FIG. 7 is a view in side elevation and in section of the integral trommel screen connected to the discharge portion of the hardening drum.
Figure 8:
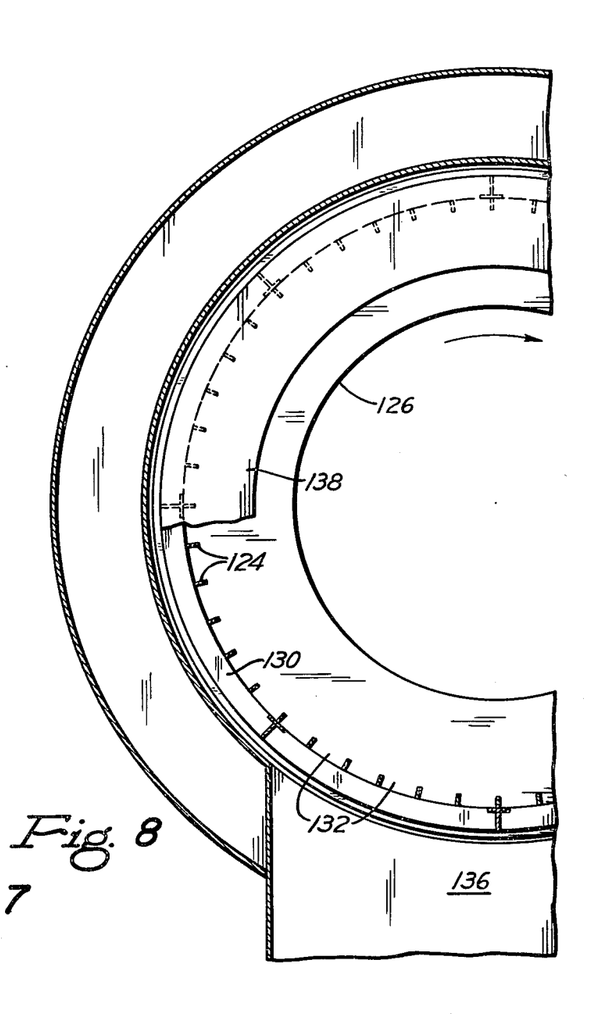
FIG. 8 is a partially sectional view in elevational taken along the line VIII—VIII of FIG. 7, illustrating in end elevation the trommel screen.

As is illustrated in FIGS. 7 and 8, the hardening drum 14 has a cylindrical trommel screen 26 secured to the discharge end portion 94. The trommel screen has a generally cylindrical configuration with longitudinally extending bars 124 secured to circular end members 126 and 128. The bars 124 are arranged in preselected spaced relation to each other. A plurality of cylindrical bars 130 are arranged in spaced relation around the longitudinal bars 124 to form generally rectangular openings designated by the numeral 132 through which agglomerates having a preselected size may pass. Agglomerates of a preselected size pass through the spaces 132 and the oversized agglomerates are discharged from the trommel screen open end portion 134. With this arrangement, the integral trommel screen 26 rotates with the hardening drum 14 and as the agglomerates are discharged from the discharge end portion of the hardening drum 14 the agglomerates move longitudinally along the trommel screen 26. The rotation of the trommel screen 26 tumbles the rigidified agglomerates so that the agglomerates of a size less than the openings 132 in trommel screen 26 pass through the openings 132 into the discharge chute 136. An annular ring member 138 is secured to the discharge end portion 134 of trommel screen 26 to form a dam so that the agglomerates are tumbled within the trommel screen and agglomerates of the preselected size are not readily discharged through the trommel screen outlet 134 into the oversized produce discharge opening 32.

The rotary scraper 34 is rotatably positioned within the balling drum 12 and the support for the front end of the rotary scraper is illustrated in FIG. 2. The support for the rear end of the rotary scraper 34 adjacent the balling drum discharge end portion 42 is illustrated in FIG. 5.

The rotary scraper 34 is rotatably positioned within the balling drum 12 in spaced relation to the drum inner wall 140 and is preferably located above a horizontal plane extending through the balling drum axis 80 and on the left side of a vertical plane extending through the drum axis 80. With this arrangement, the rotary scraper 34 is positioned in the upper left quadrant of the cylindrical opening in the balling drum 12. The position of the rotary scraper 34 is determined by the direction of drum rotation so that the scraper is positioned in a quadrant opposite to that of the inclined bed of agglomerative material.

Figure 3:
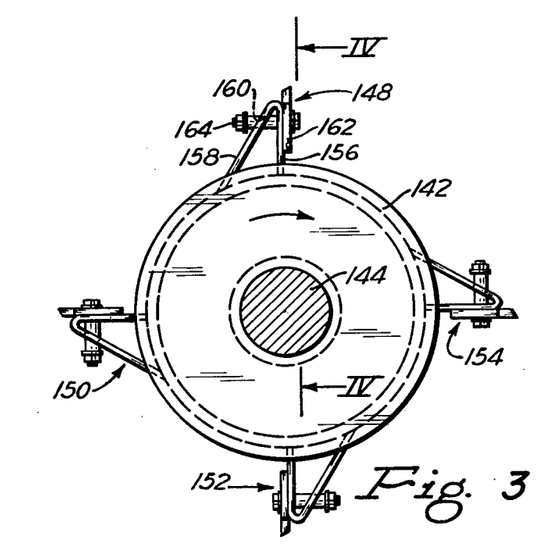
FIG. 3 is a partially sectional view in elevation taken along the line III—III of FIG. 2, illustrating the blade configuration of the rotary scraper.
Figure 4:
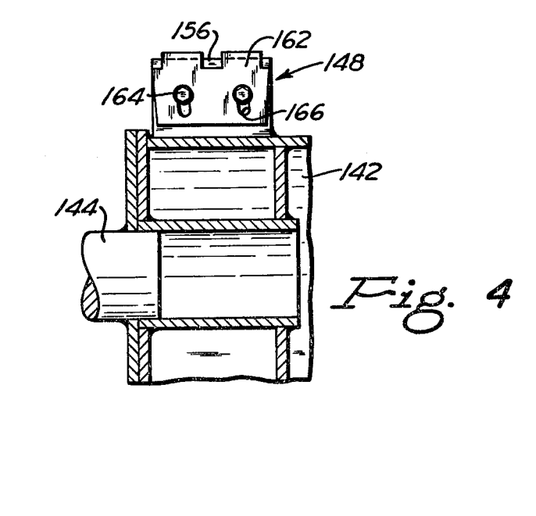
FIG. 4 is a view in section taken along the line IV—IV of FIG. 3, illustrating in detail the manner in which the scraper blades are adjustably secured to the rotary scraper body portion.

The rotary scraper 34 has a tubular body portion 142 with a front shaft 144 secured thereto and extending forwardly therefrom (FIG. 2) and a rear shaft 146 secured thereto and extending rearwardly therefrom (FIG. 5). As illustrated in FIGS. 3 and 4, the scraper 34 has four rows of scraper blade assemblies generally designated by the numerals 148, 150, 152 and 154 secured to the outer surface of the tube 142. Each of the blade assemblies includes a blade support member 156 with a rearwardly extending leg portion 158. The support member 156 and leg portion 158 have apertures 160 therethrough. The blade support members 156 and the rearwardly extending leg portions 158 are rigidly secured to the surface of the tube 142 as by welding or the like. Separate blade segments 162 are secured to the blade support members 156 by means of bolts 164 extending through the aligned apertures 160 and the elongated slots 166 in the blade segments 162. The slots 166 in the blade segments 162 permit radial adjustment of the blade segments 162 on the blade supports 156. The rows of blade assemblies 148-154 extend lengthwise along the tube 142 to form elongated continuous cutting surfaces along substantially the entire length of the scraper 34. The blade segments are equidistantly positioned on the periphery of the scraper tube 142 to provide symmetrical ridges and valleys in the layer of agglomerative material deposited on the balling drum inner wall 140. The continuous cutting surface formed by the rows of blade segments 162 follows a helical path as diagrammatically illustrated by the — . — line in FIG. 2. The blade segments 162 may be arranged in a preselected helical configuration or arranged parallel to the longitudinal axis of the scraper tube 142. With this arrangement, the rotary scraper 34 forms ridges and valleys in a layer of agglomerative materials deposited on the inner wall 140 of balling drum 12 in which the ridges serve as lifters to admix the agglomerative constituents and aid in forming agglomerates of a preselected size range from the agglomerative materials.

As illustrated in FIG. 2, the rotary scraper front shaft 144 is rotatably supported in a pillow block bearing 168 that is mounted on a structural member 170 and extends through a suitable seal 172 positioned in an aperture 174 of a housing 176. The housing 176 surrounds the balling drum feed end breech 18. The structural member 170 is secured to housing 176. A sprocket 178 is nonrotatably secured to the shaft end portion 180 of front shaft 144 that projects through the housing 176.

The drive mechanism for rotating the scraper 34 includes an endless chain 182 that is reeved about the sprocket 178 and is drivingly connected to a motor 184 through a suitable speed reducer 186, and a drive sprocket 188 is nonrotatably connected to the drive shaft of the reducer 186. Thus, the scraper 34 is arranged to rotate preferably in a direction opposite to the direction of rotation of the balling drum 12 as indicated by the directional arrow. A suitable speed control means 190 is provided to rotate the scraper 34 in synchronous relation with the balling drum 12 so that the scraper 34 rotates at a preselected speed ratio with the balling drum 12. Where desired, the control means 190 can be arranged to change the relative speeds of the scraper or the drum to obtain other speed ratios between the scraper and the drum so that the desired ridge and valley configurations may be obtained.

As illustrated in FIG. 5, the rotary scraper rear shaft 146 is supported in a pillow block bearing 192 within the balling drum 12 adjacent the balling drum discharge end portion 42. The pillow block bearing 192 is supported by a transverse beam member 194 that is positioned within the hardening drum 14 beyond the balling drum outlet end portion 42 and is secured to and supported by the center breech 16. It should be noted that the outer diameter of the balling drum 12 is smaller than the inner diameter of the hardening drum 14 so that the discharge end portion 42 of balling drum 12 extends into and beyond the inlet end portion 92 of hardening drum 14. The transverse beam member 194 has a forwardly extending portion 196 that extends into the rear discharge portion of balling drum 12 and the pillow block bearing 192 is secured to and supported on the forwardly extending portion 196.

The transverse member 194 is secured to and supported by the center breech 16 as is illustrated in FIG. 5. The transverse beam member 194 has a generally rectangular configuration and is secured at its end portions to an annular ring member 208 that forms a part of the center breech 16. The ring member remains fixed with the center breech 16 and supports the transverse member 194. The ring member 208 has an outside diameter smaller than the inner diameter of the hardening drum 14 and extends within the hardening drum 14 on the inby side of the hardening drum inlet end portion 92. With this arrangement, the rear bearing 192 is supported within the balling drum 12.

With the above described apparatus, finely divided carbonaceous materials are agglomerated at an elevated temperature to form a substantial quantity of agglomerates having a preselected size range. The carbonaceous materials at an elevated temperature are introduced into the rotating drum 12 and a layer of carbonaceous material is deposited on the inner cylindrical wall 140. A plurality of spaced ridges and valleys are formed in the layer of carbonaceous material with the ridges and valleys extending lengthwise along the inner wall 140. After the binder in the carbonaceous particles is evolved the layer of carbonaceous material loses its plasticity and rigidifies to form a relatively rigid layer with ridges and valleys formed therein.

As other finely divided carbonaceous material is introduced into the balling drum 12 the carbonaceous material forms a bed in the drum with an upper surface extending upwardly in the direction of rotation of the drum. The ridges of carbonaceous material formed on the inner wall serve as lifters to convey or lift a portion of the finely divided carbonaceous material adjacent the drum inner wall 140 in the direction of drum rotation and deposit at least a portion of this carbonaceous material one the upper surface of the bed to both intimately mix the finely divided carbonaceous material in the drum and deposit particles on the upper inclined surface of the bed. Repeated tumbling of the particles and partially formed agglomerates on the upper surface of the bed causes continued growth to form agglomerates having a preselected size range. Any finely divided carbonaceous material deposited on the exposed surface of the ridges and valleys is continually removed therefrom so that the ridges and valleys of a preselected configuration are maintained during the agglomeration process.

In this manner, a plurality of spaced elongated ridges are formed on the inner wall of the balling drum 12 to serve as lifting or mixing devices for the finely divided carbonaceous material. The scraper 34 positioned in the drum 12 initially shapes the elongated ridges and valleys in the layer of carbonaceous material and further removes other agglomerative carbonaceous material that may be deposited on the surface of the ridges and valleys so that the layer of carbonaceous material retains its ridge and valley configuration during the agglomeration process.

The center breech assembly is illustrated in detail in FIG. 6 and includes an annular support member 210 that has a first portion 212 extending around the balling drum discharge end portion 42 and an outwardly offset second portion 214 that extends around the inlet end portion 92 of hardening drum 14. The annular portion 210 has suitable refractory material to limit heat transfer therethrough and has a longitudinal dimension sufficient to extend over beyond the outlet end of balling drum 12 and the inlet end of hardening drum 14. As illustrated in FIG. 6, the annular ring 208 previously described is supported within the inlet end portion of hardening drum 14 by means of plate 216 secured to and extending from the annular support member 210. A metallic housing 218 extends around the annular member 210 and has, as illustrated in FIG. 5, a receiver 220 for the agglomerative material that collects within the receiver 220. A dam 222 also illustrated in FIG. 5 is secured to the discharge end portion of the balling drum 12 and controls the rate of discharge of the agglomerates from the balling drum 12 to the hardening drum 14. The agglomerates formed in the above described manner are very fragile and the yield of agglomerates of the desired size can be considerably diminished by conveying the agglomerates in the conventionally known manner. However, the interconnecting relationship of the balling and hardening drum members in accordance with the present invention provides substantially little damage to the agglomerates during the transfer of the agglomerates between the drums 12 and 14.

In order to provide a fluid-tight seal between the fixed center breech assembly 16 and the rotatable balling drum 12, seal assemblies designated by the numeral 224 are provided at both ends of the center breech assembly 16. The seal assembly associated with the discharge end of the balling drum 12 will be described in detail and it should be understood that the other seal assemblies are of similar construction. The balling drum 12 has an annular seal carrier ring member 226 secured to its outer wall by means of rearwardly extending plates 228. The plates have flanged portions 230 welded to the outer periphery of the wall and to the annular seal carrier ring member 226. A running seal 232 is secured to the face of the annular plate 226 secured to the balling drum 12. With this arrangement, the running seal 232 moves axially with the balling drum 12 during expansion and contraction of the balling drum 12 and further rotates with the balling drum 12.

The annular support member 210 of breech assembly 16 has an outer cylindrical surface 234 on the portion 212. An annular static seal 236 is positioned on the portion 212 in abutting and sealing relation with the outer surface 234. The static seal 236 is arranged to move longitudinally on the annular surface 234 as the running seal 232 secured to the balling drum 12 moves toward and away from the center breech support member 210. The movable portion of the running seal includes a static seal ring assembly generally designated by the numeral 238 which is movably supported on the support member 210. The static seal ring assembly includes a ring member 240 with a forwardly extending leg 242 and a rearwardly extending leg 244. An annular plate 246 is secured to the forwardly extending leg 242 in spaced relation to the ring member 240 and has an annular running seal 248 secured thereto.

The seal 248 has a front surface that is arranged to be maintained in abutting and sealing relation with the rear surface of seal 232 secured to the annular plate or ring 226 mounted on the balling drum 12. An annular plate 254 is secured to the rearwardly extending leg 244 and depends downwardly therefrom in spaced relation to the annular ring 240. The static seal 236 is positioned between the rings 240 and 254 and is in abutting relation with the walls of the respective rings as illustrated in FIG. 6. With this arrangement, longitudinal movement of the static seal ring assembly 238 on support member 210 moves the static seal ring 236 therewith. The plate 254 has a plurality of spaced apertures therearound. A plurality of piston cylinder assemblies 258 are secured to the outer surface 234 of support member 210 and have piston rods 260 extending therefrom. The piston rods 260, as illustrated in FIG. 6, extend through the apertures of plate 254 and abut the rear surface of ring member 240. Fluid under pressure urges the piston rods 260 into abutting relation with the ring member 240 which, in turn, urges the running seal 248 in abutting relation with the running seal 232.

The seal assemblies 224 thus provide a fluid-tight seal between the balling drum 12 and the breech assembly 16. The static seal 236 and the running seal 232 and abutting running seal 248 prevent the escape of gas from the internal portions of balling drum 12 and hardening drum 14 through the center breech 16. Contraction of the balling drum 12 is compensated for by the seal assemblies 224 by maintaining positive pressure with piston rods 260 against the static seal ring assembly 238. As the balling drum 12 expands a force is transmitted through the running seal 232 on seal carrier ring 226 to the seal 248. The force is opposed by the plate 246 to maintain the seal faces in sealing relation with each other.

Suitable controls are provided for the fluid pressure in the piston cylinder assemblies 258 to permit relative movement of the static seal ring assembly while maintaining the above discussed sealing rotation. As the balling drum 12 contracts, the seal 232 moves away from the seal 248 and the piston cylinder assemblies 258 move the seal ring assembly 238 on the support member 210 to maintain the running seal 248 in sealing relation with running seal 232. The static seal ring 236, as above discussed, moves longitudinally with the static seal.

Similar seal assemblies 224 are provided for the portion of the breech assembly 16 extending over the inlet portion of the hardening drum 14 and, as is illustrated in FIG. 2, for the inlet end of the balling drum 12.

A similar seal assembly 224 is provided between the outlet end of the hardening drum 14 and the discharge end breech 24 and is illustrated diagrammatically in FIG. 1. With this arrangement, the four separate seal assemblies 224 effectively seal the inner portion of the pair of drums 12 and 14 so that an inert atmosphere under positive pressure may be maintained within balling drum 12 and hardening drum 14 during the agglomeration process. The piston cylinder assemblies 258 are preferably yoke mounted on support member 210 to compensate for the relative position of balling drum 12 as the angle of inclination of the balling drum 12 is adjusted relative to the hardening drum 14.

The static seal ring assembly 238 associated with the discharge end of balling drum 12 is movably supported on the member 210 in the manner illustrated in FIG. 6. The static seal ring assembly 238 has a pair of trunnion shafts 262 extending radially therefrom with rollers 264 rotatably mounted thereon. Gusset plates (not shown) secured to the static seal ring assembly 238 support the trunnion shafts 262 and rollers 264. The rollers 264 are mounted on rails 268 that are supported on the breech assembly 16 within the housing 218. Thus, the rings 238 are supported on the member 210 by means of the rails 268 and are free to move axially on the member 210. Similarly, the ring 238 associated with the inlet end of hardening drum 14 has trunnion shafts 270 with rollers 272 rotatably mounted thereon. The rollers 272 are supported on rails 274 secured to the breech assembly 16. With this arrangement, the static seal ring assembly is supported by and free to move longitudinally on the member 210 to maintain an effective seal between the respective balling drum 12 and hardening drum 14 and the center breech assembly 16 as the drums 12 and 14 expand and contract.

According to the provisions of the Patent Statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. A method for forming an agglomerated product from agglomerative material comprising, feeding substantially dry finely divided agglomerative materials into the inlet portion of a first drum member, at least one of said materials being at an elevated temperature to supply sensible heat during agglomeration and another of said materials capable of evolving a fluid binder to agglomerate said materials into a loosely coherent plastic mass, rotating said first drum member to intimately mix said finely divided agglomerative materials in said first drum member in a manner that one of said materials heats the other of said materials to evolve the fluid binder and form a loosely coherent plastic mass therefrom while moving said agglomerative materials from said first drum inlet portion toward the first drum outlet portion, controlling the speed of rotation of said first drum member to thereby control the rate of mixing of said agglomerative materials while forming said loosely coherent plastic mass, rotating said first drum member to agglomerate said loosely coherent plastic mass into discrete agglomerates, regulating the slope of said first drum member to control the residence time of said discrete agglomerates in said first drum member, directly transferring the discrete agglomerates of said loosely coherent plastic mass from said first drum member outlet portion into the inlet portion of a hardening drum member, rotating said hardening drum to rigidify and harden said agglomerates in said hardening drum member and forming relatively hard rigidified agglomerates, and rotating said hardening drum to convey said agglomerates from said hardening drum inlet portion to said hardening drum discharge portion, discharging said relatively hard rigidified agglomerates from the discharge portion of said hardening drum member.

2. A method for forming an agglomerated product from agglomerative materials as set forth in claim 1 which includes, maintaining an inert atmosphere at a positive pressure within both of said drums.

3. A method for forming an agglomerated product from agglomerative materials as set forth in claim 1 which includes, depositing a layer of said agglomerative materials on the inner wall of said first drum member, and maintaining a preselected thickness of said layer.

4. A method for forming an agglomerated product from agglomerative materials as set forth in claim 1 in which said agglomerative materials include, coal and char, and heating said char to an elevated temperature before introducing said char into said first drum member.

5. A method for forming an agglomerated product from agglomerative materials as set forth in claim 4 which includes, evolving tar from said coal in said first drum member while forming said loosely coherent plastic mass from said coal and char.

6. A method for forming agglomerates of carbonaceous material from finely divided particulate carbonaceous material comprising, heating particulate finely divided char to an elevated temperature before introducing said char into a first drum member so that said char is capable of supplying substantially all of the sensible heat during agglomeration, feeding particulate finely divided coal and said char at said elevated temperature into the inlet portion of said first drum member, rotating said first drum member to intimately mix said finely divided coal and said char in said first drum member in a manner that said char heats said particulate coal and said particulate coal evolves a tar binder to agglomerate said particulate coal and char and form a loosely coherent plastic mass and move said loosely coherent plastic mass from said first drum member inlet portion toward said first drum member outlet portion, controlling the speed of rotation of said first drum member to thereby control the rate of mixing of said particulate coal and char while forming said loosely coherent plastic mass, rotating said first drum member to agglomerate said loosely coherent plastic mass into discrete agglomerates of coal and char, regulating the slope of said first drum member to control the residence time of said discrete agglomerates in said first drum member, directly transferring said discrete agglomerates of said coal and char from said outlet portion of said first drum member into the inlet portion of a hardening drum member, rotating said hardening drum member to rigidify and harden said agglomerates in said hardening drum member, maintaining an inert atmosphere and a positive pressure within both of said drum members, and rotating said hardening drum member to convey said agglomerates from said hardening drum member inlet portion to said hardening drum member outlet portion and discharging said rigidified agglomerates from the discharge portion of said hardening drum member.

7. A method for forming agglomerates of carbonaceous material from particulate carbonaceous material as set forth in claim 6 which includes, depositing a layer of loosely coherent plastic mass on the inner wall of said first drum member, agglomerating and rigidifying said layer, and maintaining a preselected thickness of said layer.

* * * * *